(12) United States Patent
Yarkosky

(10) Patent No.: US 7,190,958 B1
(45) Date of Patent: Mar. 13, 2007

(54) METHOD AND SYSTEM FOR ADJUSTING COVERAGE AREAS OF A WIRELESS TELECOMMUNICATIONS NETWORK

(75) Inventor: Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 609 days.

(21) Appl. No.: 10/639,310

(22) Filed: Aug. 12, 2003

(51) Int. Cl.
*H04Q 7/20* (2006.01)
(52) U.S. Cl. .................................... 455/436; 455/438
(58) Field of Classification Search .............. 455/436, 455/522; 370/335, 318, 320, 332, 342, 441
See application file for complete search history.

(56) References Cited

U.S. PATENT DOCUMENTS

| | | | |
|---|---|---|---|
| 5,499,395 A * | 3/1996 | Doi et al. ................. | 455/422.1 |
| 6,385,183 B1 * | 5/2002 | Takeo .......................... | 370/335 |
| 2003/0045317 A1 * | 3/2003 | Pan et al. .................... | 455/518 |

* cited by examiner

*Primary Examiner*—Matthew Anderson
*Assistant Examiner*—Sanh Phu

(57) ABSTRACT

In a wireless telecommunications network, multiple mobile stations may communicate with a base transceiver station. Based on the number of mobile stations being served by the base transceiver station, the base transceiver station may adjust the power levels of signals it uses to communicate with mobiles stations. The power levels of signals adjacent base transceiver stations use to communicate with mobile stations may also be adjusted.

14 Claims, 5 Drawing Sheets

METHOD AND SYSTEM FOR ADJUSTING COVERAGE AREAS OF A WIRELESS TELECOMMUNICATIONS NETWORK

FIELD OF THE INVENTION

This invention relates generally to wireless telecommunications networks. More specifically it relates to a method for adjusting coverage areas in a wireless telecommunications network.

BACKGROUND OF THE INVENTION

Wireless telecommunications technologies are an increasingly popular means of personal communication in the modern world. People are using wireless telecommunications networks for the exchange of voice and data over mobile phones, personal digital assistants ("PDAs"), wireless modems and other devices. Using the connectivity provided by the wireless telecommunications network, a user may seek information over the Internet or call anyone over a Public Switched Telephone Network ("PSTN") from any place inside the coverage area of the wireless telecommunications network.

In a typical wireless telecommunications network, an area is divided geographically into a number of cells, each defined by a radio frequency ("RF") radiation pattern from a respective base transceiver station ("BTS"). The BTSs in the cells are in turn coupled to a base station controller ("BSC"), which is then coupled to a telecommunications switch or gateway, such as a mobile switching center ("MSC"). The MSC or gateway may then be coupled to a telecommunications network, such as the PSTN or the Internet.

When a mobile station is positioned in a cell, the mobile station communicates via an RF interface with the BTS of the cell. Consequently, a communication path is established between the mobile station and the wireless telecommunications network via the air interface, the BTS, the BSC and the MSC. A mobile station, however, is generally not confined to a single cell. The mobile station may travel among different cells. As the mobile station enters a new cell, it may handoff from the BTS for its previous cell to the BTS for its current cell.

With the explosive growth in demand for wireless communications, the level of call traffic in most cells has increased drastically over recent years. A BTS, however, can only simultaneously serve a finite number of mobile stations. When a particular BTS is at or near its capacity, other mobile stations within that cell might be unable to establish a traffic channel with the BTS and thereby be served by the BTS. This may potentially deny these mobile stations access to the wireless telecommunications network.

Therefore, there exists a need for an improved method for providing services to mobile stations in a wireless telecommunications network.

SUMMARY OF THE INVENTION

In a wireless telecommunications network, multiple mobile stations may communicate with a base transceiver station. Oftentimes, mobile stations are not evenly distributed throughout the wireless telecommunications network. For example, one cell may include a large number of mobile stations, while one or more adjacent cells may include a smaller number of mobile stations. Thus, while a BTS for the one cell might be operating at or near its capacity, the BTSs for the adjacent cells might have the capacity to serve a number of additional mobile stations.

Based on the number of mobile stations in a particular sector, the wireless telecommunications network may adjust power levels of signals a BTS uses to communicate with mobile stations. For example, the wireless telecommunications network may reduce the power levels of signals a BTS uses to communicate with mobile stations, thereby potentially causing mobile stations to handoff to another cell. In another example, the wireless telecommunications network may increase the power levels of signals a BTS uses to communicate with mobile stations, thereby potentially causes mobile stations in other cells to handoff to the BTS.

In one aspect, if the number of mobile stations served by the base transceiver station exceeds a first predetermined threshold, the base transceiver station may decrease the power level of signals the base transceiver station uses to communicate with mobile stations. For example, the base transceiver station may decrease the power level of pilot signals it transmits to mobile stations. In another example, the base transceiver station may decrease the power level of signals it transmits to mobile stations via forward traffic channels.

Decreasing the power level of these signals may effectively reduce the coverage area of the base transceiver station. Mobile stations near the boundary of the base transceiver station's coverage area may then detect stronger pilot signals from base transceiver stations in adjacent cells. When these mobile stations then establish a connection, they may do so with one of the adjacent base transceiver stations. Similarly, mobile stations near the boundary of the base transceiver station's coverage area that are already being served by the base transceiver station may detect stronger pilot signals from adjacent base transceiver stations. This may cause these mobile stations to handoff to the adjacent base transceiver stations.

In another aspect, the adjacent base transceiver stations may increase the power level of signals they transmit to mobile stations, such as by increasing the power level of pilot signals or forward traffic channel signals. This may effectively increase the coverage area of the adjacent base transceiver stations, thereby potentially preventing gaps in the wireless telecommunications network that may otherwise occur due to the decreased coverage area of the base transceiver station. In yet another aspect, the base transceiver station may then increase the power level of its signals when it determines the number of mobile stations in its cell has fallen below a second predetermined threshold. The adjacent base transceiver stations may also reduce their power levels.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Wireless Telecommunications Network Architecture

Figure 1:
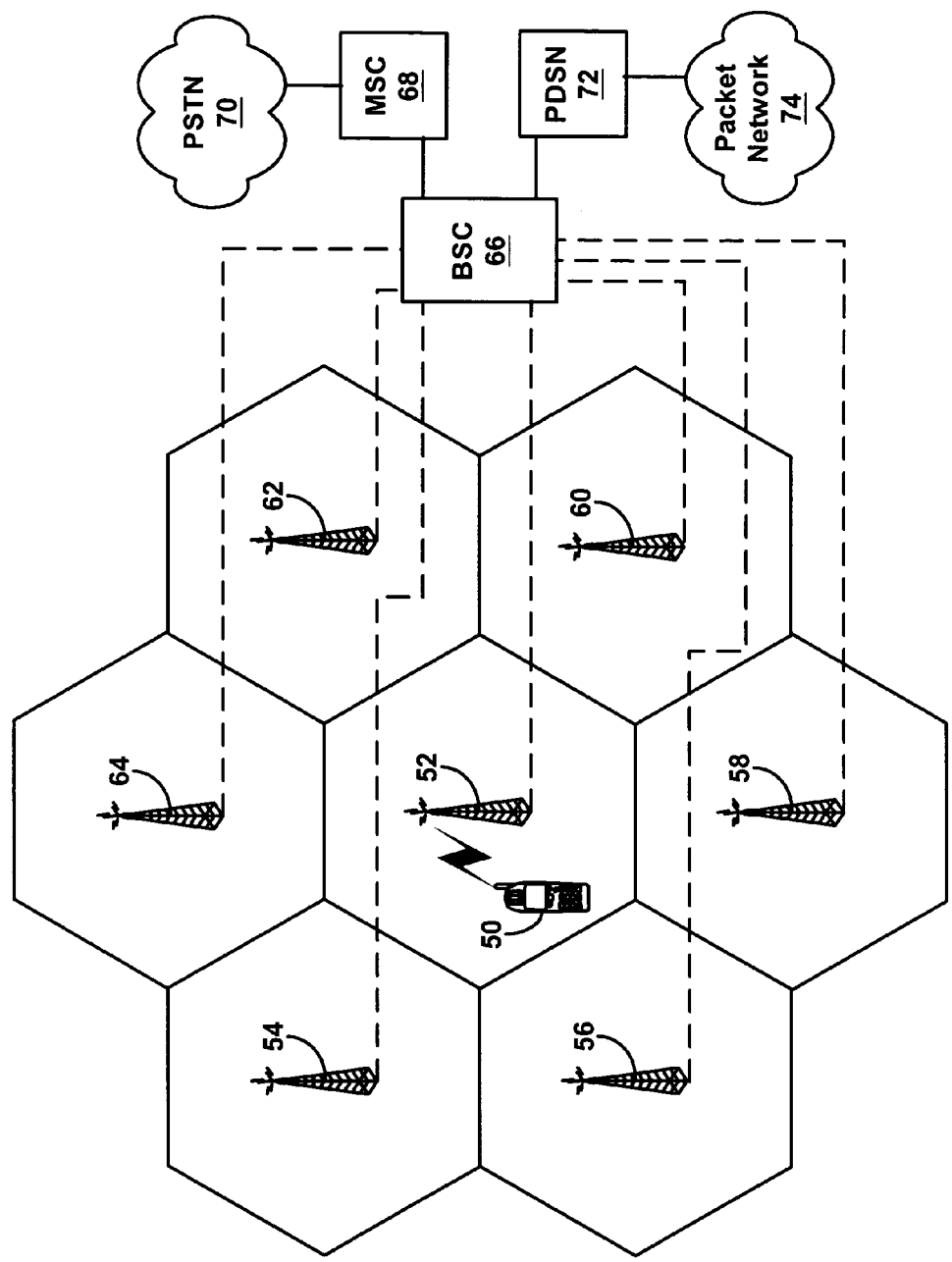
FIG. 1 shows a simplified block diagram of a wireless telecommunications network in which an exemplary embodiment of the present invention can be deployed.

FIG. 1 shows a simplified block diagram of a wireless telecommunications network in which an exemplary embodiment of the present invention can be deployed. As shown in FIG. 1, a mobile station 50 communicates with a base transceiver station ("BTS") 52 via an air interface. The mobile station 50 can communicate with the BTS 52 using a variety of different protocols. In one exemplary embodiment, the mobile station 50 communicates with the BTS 52 via the air interface using Code Division Multiple Access ("CDMA"), such as in a CDMA2000 network.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other wireless protocols may also be used. For example, the mobile station 50 and the BTS 52 may communicate using Wideband CDMA ("WCDMA"), Time Division-Synchronous CDMA ("TD-SCDMA"), or any other wireless protocol in which the users are power controlled and in which noise or interference may affect the capacity of the wireless network.

As shown in FIG. 1, the wireless telecommunications network includes a number of cells. One cell includes the mobile station 50 and BTS 52, and surrounding this cell are six adjacent cells. Each of the adjacent cells is defined by an RF radiation pattern from a respective BTS 54, 56, 58, 60, 62, 64. The adjacent cells may each include one or more mobile stations, although none are depicted in FIG. 1. Also, each cell may be further divided into sectors. For example, a cell may include three to six different sectors. It is possible, however, a cell to include a greater or fewer number of sectors.

The cells in FIG. 1 are depicted in an idealized fashion, as hexagons that do not overlap with the other cells. In reality, however, most cells will overlap with adjacent cells, and the individual cells will vary widely in shape and size. Depending on the particular implementation, the wireless telecommunications network may include a greater or fewer number of cells than are depicted in FIG. 1. Additionally, depending on the particular network configuration, a particular cell may have a greater or fewer number of adjacent cells than are depicted in FIG. 1.

Each BTS 52, 54, 56, 58, 60, 62, 64 connects to a base station controller ("BSC") 66. The BSC 66 in turn connects to a mobile switching center ("MSC") 68. The MSC 68 may provide additional connectivity to the public switched telephone network ("PSTN") 70. Using this connectivity, the mobile station 50 can communicate with another entity that is also connected to the PSTN 70. The BSC 66 may additionally interface with a packet data serving node ("PDSN") 72, which can turn provide connectivity to a packet network 74, such as an intranet or the Internet. Using this connectivity, the mobile station 50 may then communicate with one or more devices on the packet network 74.

The BSC 66 may serve as a general control element for the wireless telecommunications network. For example, the BSC 66 may handle setting up and switching calls to and from the cells, interfacing with the other transport networks, monitoring traffic to facilitate billing, performing testing and diagnostic services, and performing other network management functions. The BSC 66 is also usually responsible for managing handoff of signaling and call traffic as a mobile station moves from one cell to another in the wireless telecommunications network. The BSC 66 may also control power levels and frequency allocations.

It should be understood that the architecture of FIG. 1 and the other arrangements described herein are provided as examples only. Other arrangements and other elements (e.g., machines, interfaces, functions, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location.

2. Exemplary Mobile Station/BTS Communication

The RF spectrum between the mobile station 50 and the BTS 52 can be divided into various different channels or frequencies. Generally, a portion of the RF spectrum is allocated for the uplink direction (i.e., from the mobile station 50 to the BTS 52), while another portion of the RF spectrum is allocated for the downlink direction (i.e., from the BTS 52 to the mobile station 50). The particular frequencies and bandwidths of the spectrum allocation generally depend on the wireless protocol used for communication between the mobile station 50 and BTS 52 as well as the particular wireless telecommunications network implementation.

In an exemplary CDMA2000 implementation, the uplink direction may be further divided into two logical channels—an access channel and a traffic channel. As a matter of convention, this traffic channel is generally referred to as the bearer channel. The mobile station 50 may use the access channel to send signaling messages, such as call origination requests, page responses, registration requests, order messages and other signaling messages. The mobile station 50 may use the traffic channel to send voice or data traffic. Additionally, the mobile station 50 may use the traffic channel during a call to send signaling messages to the BTS 52. These signaling messages may include handoff completion messages, pilot strength measurement messages, power measurement messages and other messages.

The downlink direction may be further divided into four classes of logical channels. These logical channels include a sync channel, up to seven paging channels, up to 55 traffic channels and a pilot channel. The sync channel may transmit information that the mobile station 50 can use to acquire time and frame synchronization. The paging channels may carry system overhead information, which can include system parameters, access parameters, a CDMA channel list and other information. These channels can additionally be used to send pages and other messages to the mobile station 50.

The traffic channels can carry voice and data traffic to the mobile station 50 as well as other mobile stations, and the traffic channels may additionally be used to send signaling messages. As a matter of convention, these traffic channels are generally referred to as forward traffic channels. The mobile station 50 can use the pilot channel to acquire the BTS 52. The mobile station 50 can use the pilot signals from multiple BTSs in order to determine from which BTS the mobile station 50 should request a forward traffic channel, or if the mobile station 50 is already being served by a BTS, whether to handoff to another BTS.

If the mobile station 50 is not being served, the mobile station 50 may monitor the relative strengths of pilot signals from multiple BTSs. When the mobile station 50 then wants to request a forward traffic channel, such as can be used to access the wireless telecommunications network, the mobile station 50 can request a forward traffic channel from the BTS having pilot signal with the best interference ratio. Once the mobile station 50 is assigned a forward traffic channel from a BTS, the mobile station 50 may continue to monitor the relative strengths of the pilot signals from adjacent BTSs.

If the mobile station 50 detects that a pilot signal from an adjacent BTS is significantly stronger than one or more of the forward traffic channels assigned to the mobile station 50, the mobile station 50 may then begin a process to handoff to an adjacent BTS. For example, when the mobile station 50 detects that a pilot signal from an adjacent BTS is significantly stronger then one of the mobile station's forward traffic channels, the mobile station 50 may send a message to its serving BTS requesting a handoff. The mobile station 50 and the serving BTS may then cooperatively communicate in order to handoff the mobile station 50 from the serving BTS to the adjacent BTS having the significantly stronger pilot signal.

As previously described, a cell may be further divided into a number of sectors. Each sector may use the same forward traffic channels allocated to a BTS, but with a different PN offset. Mobile stations in one sector would communicate with the BTS using a different PN offset than mobile stations in another sectors. As mobile stations in different sectors communicate with the BTS using different PN offsets, a mobile station may handoff among different sectors within the same cell. This is often called a soft handoff.

It should be understood that the previously described channel allocations and handoff process are merely exemplary in nature. Other networks, including other CDMA networks, may use different channels allocations as well as different types of channels. Additionally, the handoff process may vary from network to network. Other variations may exist as well.

3. Exemplary Change in Coverage Area of a Cell

Figure 2A:
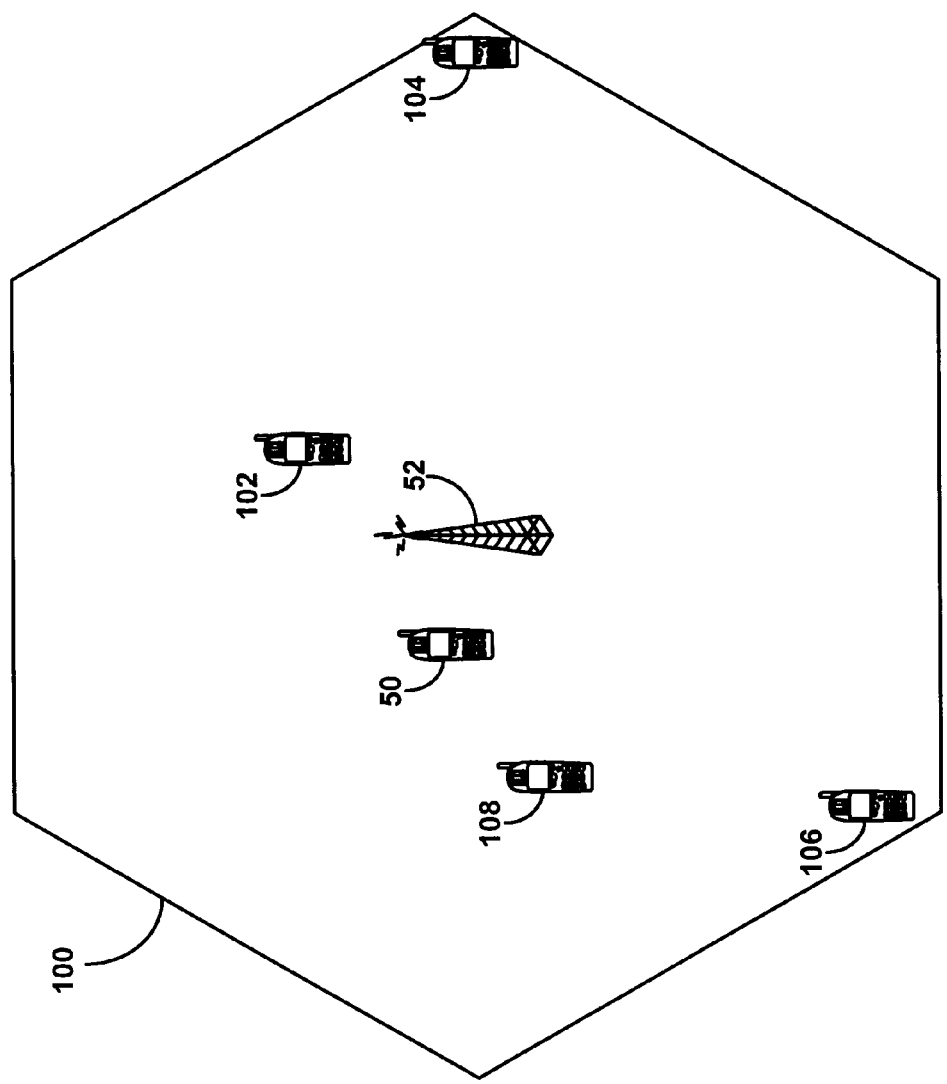
FIG. 2A is a block diagram of an exemplary cell from the wireless telecommunications network of FIG. 1 having an initial coverage area.

FIG. 2A is a block diagram of an exemplary cell from the wireless telecommunications network of FIG. 1 having an initial coverage area. The initial coverage area of the BTS 52, and thus the cell, is generally indicated by a first boundary 100. The first boundary 100 is generally centered around the BTS 52, although in practice it is unlikely that the BTS 52 would be located at the exact center of the cell. As shown in FIG. 2A, the mobile station 50 is within the coverage area of the BTS 52. Other mobile stations 102, 104, 106, 108 are also located throughout the coverage area of the cell. Although FIG. 2A depicts five mobile stations 50, 102, 104, 106, 108 within the cell, it should be understood that the cell may include a greater or fewer number of mobile stations.

The BTS 52 may alter the coverage area of the cell by decreasing the power level of pilot channel signals the BTS 52 transmits to the mobile stations 50, 102, 104, 106, 108 within the cell. For example, the BTS 52 might decrease the power level of pilot signals transmitted to the mobile stations 50, 102, 104, 106, 108. In another example, BTS 52 might decrease the power level of pilot channel signals transmitted to the mobile stations 50, 102, 104, 106, 108 on forward traffic channels. These power level adjustments may have an effect on the number of mobile stations being served by the BTS 52.

For example, decreasing the power level of pilot signals transmitted from the BTS 52 to the mobile stations 50 might decrease the likelihood that mobile stations may attempt to establish a forward traffic channel with the BTS 52. As previously described, the mobile stations may monitor pilot signals from multiple different BTSs. When a mobile station receives an indication to establish a forward traffic channel, such as in response to a dialed number from a user of the mobile station, the mobile station may then attempt to establish a traffic channel with the BTS sending the strongest pilot signal to the mobile station. The mobile station will often detect the strongest pilot signal from the closest BTS, although this is not necessarily always true.

By decreasing the power level of its pilot signal, the BTS 52 decreases the range of its pilot signal. Mobile stations farther away from the BTS 52, such as those near the first boundary 100, would then be less likely to detect the pilot signal from the BTS 52 as the strongest pilot signal. Thus, mobile stations farther away from the BTS 52 (e.g., mobile stations closer to the first boundary 100) would be more likely to establish a traffic channel with a BTS for an adjacent cell than with the BTS 52. This may then reduce the number of mobile stations attempting to establish, and thereby also establishing, a forward traffic channel with the BTS 52.

Decreasing the power level of the pilot signal might also have an effect on mobiles stations currently being served by the BTS 52. For example, those mobile stations farther away from the BTS 52 would be less likely to detect the pilot signal from the BTS 52 as the strongest pilot signal. A significant enough decrease in the power level of the pilot channel may then cause one or more of these mobile stations to handoff from the BTS 52 to an adjacent BTS.

Figure 2B:
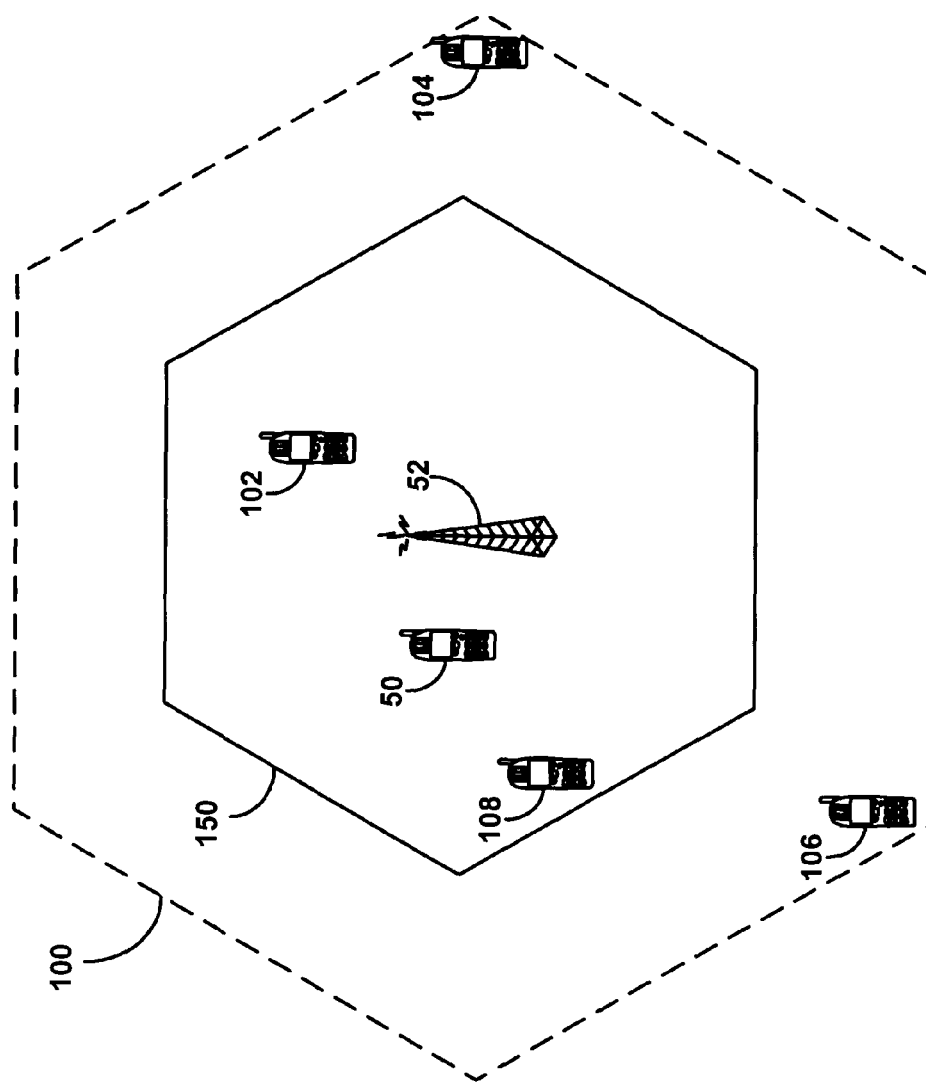
FIG. 2B is a block diagram of the exemplary cell of FIG. 2A having a reduced coverage area, such as can be caused by decreasing the power level of signals transmitted by a base transceiver station for the cell.

FIG. 2B is a block diagram of the exemplary cell of FIG. 2A having a reduced coverage area, such as can be caused by decreasing the power level of signals transmitted by a base transceiver station for the cell. FIG. 2B depicts the BTS 52 and the mobile stations 50, 102, 104, 106, 108. FIG. 2B additionally depicts the first boundary 100, which generally represents the area in which signals transmitted by the BTS 52 will be stronger than signals transmitted by adjacent BTSs. As the BTS 52 decreases the power level of its signals, the area in which mobile stations would detect the BTS 52 as transmitting the strongest signals generally decrease to that area marked by the second boundary 150.

As illustrated in FIG. 2B, two mobile stations 104, 106 are generally located in the area between the first boundary 100 and the second boundary 150. When the BTS 52 decreases the strength of its signals, the two mobile stations 104, 106 would generally fall outside the second boundary 150. Thus, the two mobile stations 104, 106 would generally detect that signals from adjacent BTSs are stronger than the signals from the BTS 52. For example, the pilot signal of the BTS 52 would likely no longer be the strongest pilot signal received by the mobile stations 104, 106.

This may then cause the two mobile stations 104, 106 to communicate with an adjacent base transceiver station. For example, if the two mobile stations 104, 106 were not currently being served by the BTS 52 and subsequently established a connection with a BTS, the two mobile stations would then establish a connection with an adjacent BTS instead of establishing a connection with the BTS 52. If the BTS 52 was currently serving the mobile stations 104, 106, then the decrease in the power level of signals transmitted by the BTS 52 may cause the mobile stations 104, 106 to handoff to an adjacent BTS.

4. Exemplary Processes for Adjusting Power Levels

Figure 3:
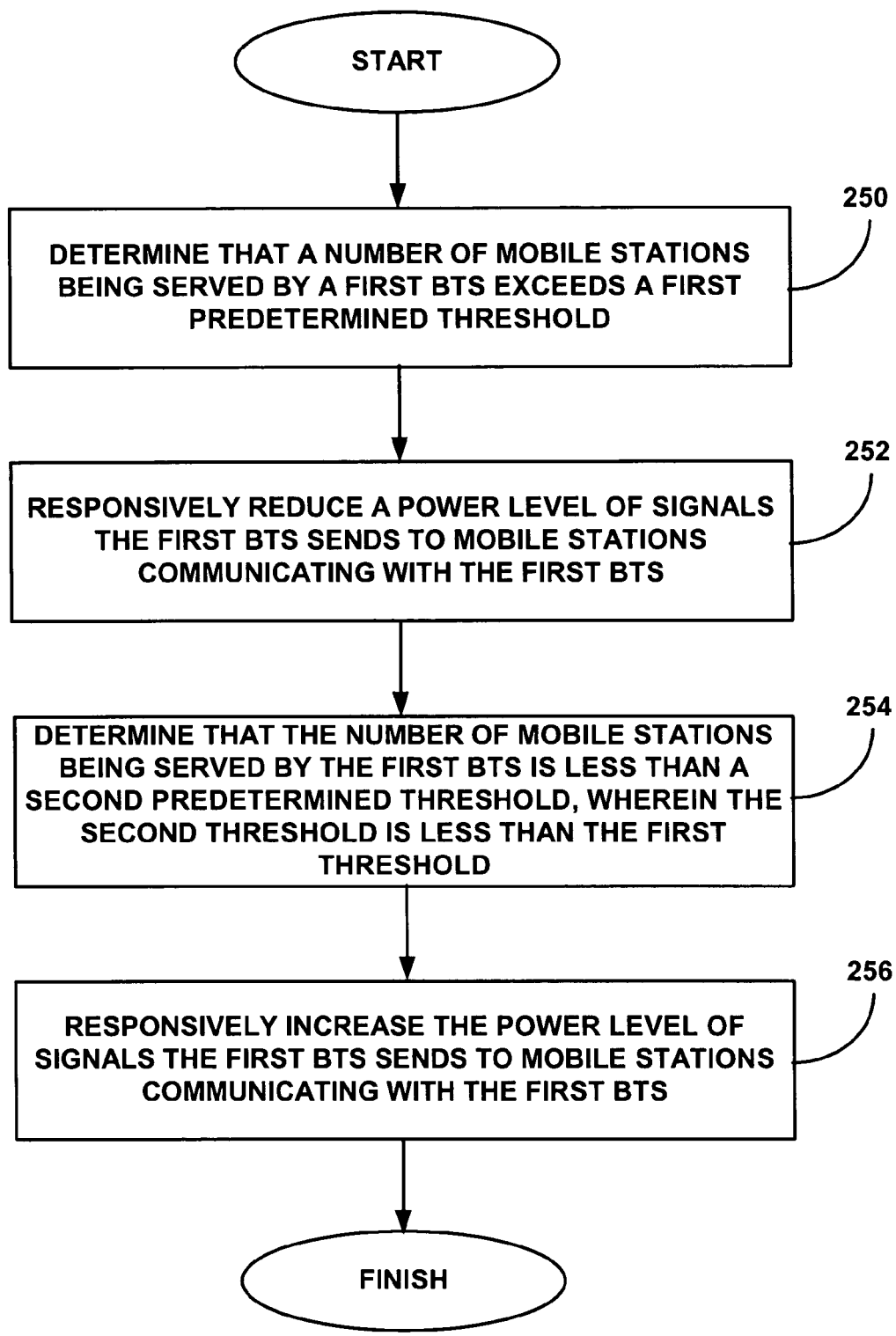
FIG. 3 is a flowchart of an exemplary process for adjusting power levels of a base transceiver station in the wireless telecommunications network of FIG. 1.

FIG. 3 is a flowchart of an exemplary process for adjusting power levels of a base transceiver station in the wireless telecommunications network of FIG. 1. This process may be used, for example, to force one or more mobile stations currently being served by one BTS to handoff to another BTS. At Step 250, a BSC determines that a number of mobile stations being served by a first BTS exceeds a first predetermined threshold. The BSC ordinarily monitors the number of mobile stations served by its respective base transceiver stations, and can therefore determine when the number of mobile stations being served by the first BTS exceeds the first predetermined threshold.

Each BTS in the wireless telecommunications network may monitor the number of mobile stations it currently serves. Therefore, in an alternate embodiment, the first BTS might detect that the number of mobile stations it currently serves has exceeded the first predetermined threshold. In alternate embodiments, the first BTS might make the determination and notify the BSC, or the first BTS and the BSC might independently make the same determination.

The first predetermined threshold may be any number, but in a preferred embodiment is lower than the maximum number of mobile stations that can be served by the first BTS. Thus, the BSC would detect the increased usage of the first BTS before the first BTS reaches its capacity. However, the predetermined number might alternatively be set to the maximum number of mobile stations that can be served by the first BTS.

Then, at Step 252, the BSC responsively reduces a power level of pilot channel signals the first BTS sends to mobile stations communicating with the first BTS. For example, the BSC might make the determination that the number of mobile stations being served by the first BTS has exceeded the first predetermined threshold. The BSC may then instruct the first BTS to reduce the power level of the signals it sends to mobile stations communication with the first BTS. For example, the BTS may reduce the power level of its pilot signals, it may reduce the power level of signals it transmits to mobile stations via forward traffic channels, it may reduce the power level of both these types of signals or it may reduce the power level of other types of signals.

The first BTS may use a variety of different power levels to communicate with mobile stations. For example, in some power control systems the first BTS may adjust the power levels of signal it uses to communicate with a mobile station based on that mobile station's distance from the first BTS. The first BTS might use stronger power levels to communicate with a mobile station farther away from the first BTS, and the first BTS might use lower power levels to communicate with a mobile station closer to the first BTS. Thus, in one embodiment, reducing a power level of signals the first BTS sends to mobile stations communicating with the first BTS might include making a proportional decrease in the power level of the first BTS's signals. For example, the first BTS might reduce the power levels of its signals by a specific percentage.

In determining whether to instruct the first BTS to reduce the power level of its signals, the BSC may consider other factors than just the number of mobile stations being served by the first BTS. For example, the BSC may first check the number of mobile stations being served by adjacent base transceiver stations. If the adjacent base transceiver stations are also operating at an increased capacity, then the BSC may determine that the first BTS should not decrease the power level of its signals. Thus, if the adjacent base transceiver stations also have an increased capacity, then it would not make sense to transfer mobile stations from the first BTS to those adjacent base transceiver stations. Therefore, even if the BSC determines that the number of mobile stations being served by the first BTS exceeds the first predetermined threshold, the BSC might not instruct the first BTS to reduce the power level of its signals.

Next, at Step 254, the BSC determines that the number of mobile stations being served by the first BTS is less than a second predetermined threshold, wherein the second predetermined threshold is less than the first predetermined threshold. Thus, the BSC determines that the number of mobile stations connected to the first BTS has decreased such that the first BTS has the capacity to serve additional mobile stations.

The second predetermined threshold is preferably set lower than the first predetermined threshold. Setting the thresholds in this manner may help prevent the first BTS from repeatedly increasing and the decreasing its power levels if the number of mobile stations served by the first BTS oscillates around the first predetermined threshold. It should be understood, however, that the second predetermined threshold may be set to any value, such as the value of the first predetermined threshold.

In response to the determination that the number of mobile stations being served by the first BTS is less than the second predetermined threshold, the first BTS increases the power level of signals the first BTS sends to mobile stations communicating with the first BTS, as shown at Step 256. In one embodiment, the first BTS makes this determination and responsively increases the power level of its signal. In another embodiment, the first BTS makes this determination and notifies the BSC. After receiving a response from the BSC, the first BTS then increases the power level of its signals. In yet another embodiment, the BSC makes the determination and notifies the first BTS, which in turn increases the power level of its signals.

Increasing the power level of the signals transmitted by the first BTS can again extend the coverage area of the first BTS. For example, the first BTS may increase the power level of its pilot signals, thereby increasing the likelihood that mobile stations farther away from the first BTS will detect that the pilot signal from the first BTS is stronger than pilot signals from adjacent base transceiver stations. This may cause mobile stations farther away from the first BTS to request a forward traffic channel from the first BTS, or it may cause mobile stations farther away from the first BTS to handoff from an adjacent BTS to the first BTS. In another example, the first BTS may increase the strength of signals sent via the forward traffic channels, thereby allowing mobile stations to travel further away from the first BTS while still being served by the first BTS.

Many different variations may be made to the process described in FIG. 3. For example, as previously described, a cell may include more than one sector. The process of FIG. 3 may also be used to adjust power levels the first BTS uses to communicate with mobile stations in different sectors. Thus, the BTS could adjust its power levels to cause mobile stations to handoff between sectors. Thus, it should be understood with the discuss herein refers to handoffs between sectors and methods for causing mobile stations to handoff between cells, the principles may equally apply to sectors within a particular cell.

In another variation, mobile stations may be forced to handoff to adjacent cells by increasing the power levels of signals the BTSs for the adjacent cells use to communicate with mobile stations. For example, after determining that the number of mobile stations being served by the first BTS exceeds the first predetermined threshold, the power levels of signals transmitted by BTSs for adjacent cells might be increased. The power levels of signals transmitted by the first BTS might remain the same. The increase of the power levels of adjacent BTSs might cause mobile stations to handoff from the first BTS to an adjacent BTS, thereby reducing the number of mobile stations being served by the first BTS.

Figure 4:
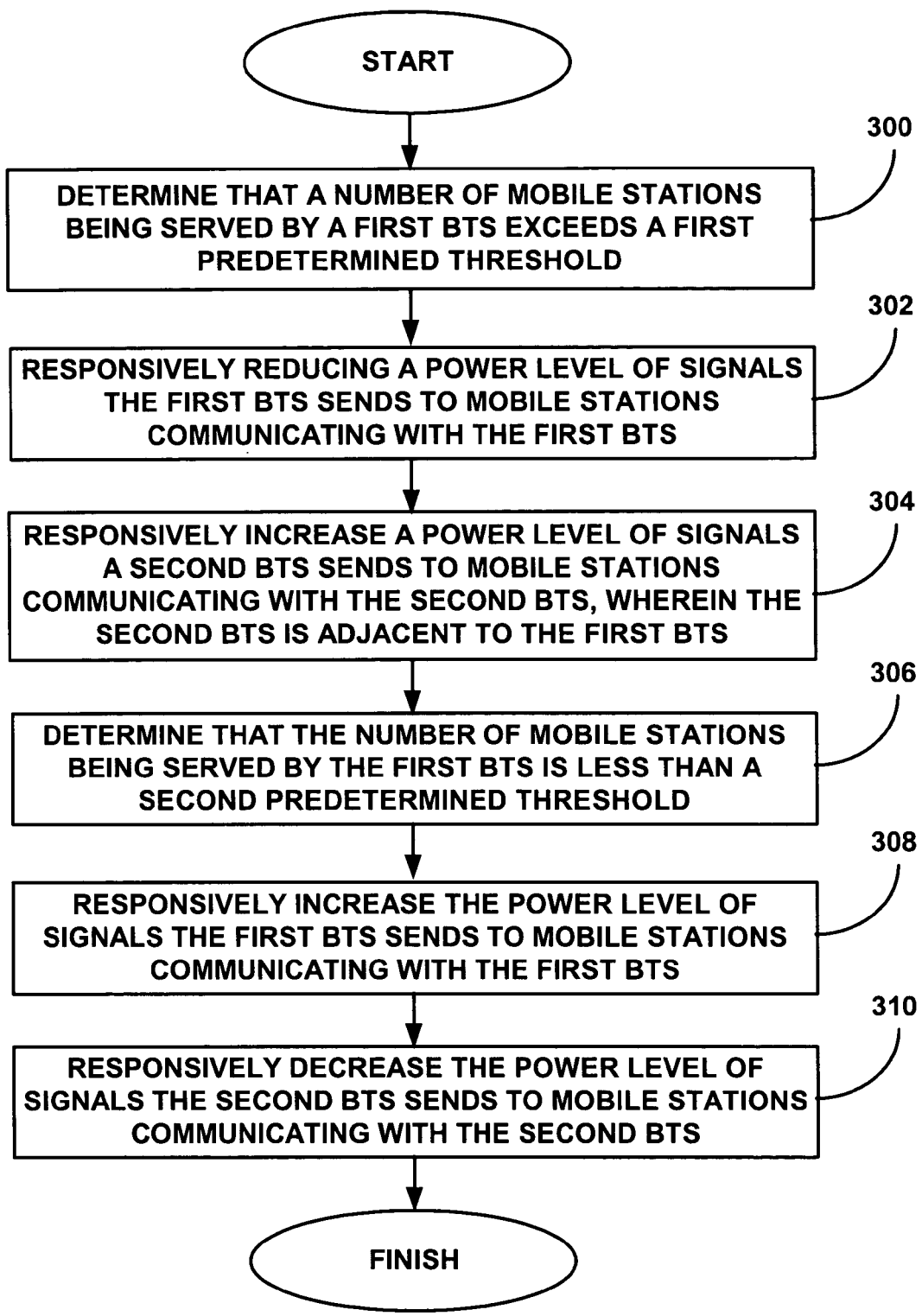
FIG. 4 is a flowchart of an exemplary process for adjusting power levels of a base transceiver station and adjacent base transceiver stations in the wireless telecommunications network of FIG. 1.

FIG. 4 is a flowchart of an exemplary process for adjusting power levels of a base transceiver station and adjacent base transceiver stations in the wireless telecommunications network of FIG. 1. At Step 300, a BSC determines that a number of mobile stations being served by a first BTS exceeds a first predetermined threshold. As previously described, this determination may alternatively be made by the first BTS or by the first BTS in conjunction with the BSC. Then, the first BTS responsively reduces a power level of signals it sends to mobile stations communicating with the first BTS, as shown at Step 302.

At Step 304, the BSC responsively increases a power level of signals a second BTS sends to mobile stations communicating with the second BTS, wherein the second BTS is adjacent to the first BTS. For example, the BSC may determine that a first BTS has decreased the power level of signals the first BTS transmits to mobile stations. Then, the BSC may responsively notify the second BTS to increase the power levels of signal the second BTS transmits to mobile stations.

The decreased power level of signals transmitted by the first BTS may create gaps in the coverage area of the wireless telecommunications network, such as between the cell of the first BTS and one or more adjacent cells. In these areas mobile stations may get poor service or they may be unable to connect to the wireless telecommunications network at all. Increasing the power level of signals transmitted by the second BTS generally increases the coverage area of the second BTS, thereby potentially extending service into areas previously covered by the first BTS.

In one alternate embodiment, the power levels of the second BTS are not increased in response to decreasing the power level of the first BTS, and therefore Step 304 might not be performed. In another alternate embodiment, the power levels of more than one adjacent BTS may be increased in response to a decrease in power levels of the first BTS. For example, the BSC may increase the power levels of some or all adjacent BTSs.

The BSC may take into account various factors in determining whether to increase the power levels of adjacent BTSs, such as the capacity of the adjacent BTSs and the number of mobile stations currently being served by the adjacent BTSs. The BSC may also use these or other factors to determine how great an increase in power level should be made for a particular adjacent BTS. Thus, the BSC may increase the power levels of some adjacent BTSs more than it increases the power levels of other adjacent BTSs.

At Step 306, the BSC determines that the number of mobile stations being served by the first BTS is less than a second predetermined threshold, wherein the second predetermined threshold is less than the first predetermined threshold. Then, at Step 308, the BSC responsively increases the power level of signals the first BTS sends to mobile stations communicating with the first BTS. The BSC responsively decreases the power level of signals the second BTS sends to mobile stations communicating with the second BTS, as shown at Step 310. Thus, as the first BTS again increase its coverage area, the coverage areas of one or more adjacent cells may be decreased.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for adjusting power levels of a first base transceiver station and a second base transceiver station in a wireless telecommunications network, the method comprising:
    determining that a number of mobile stations being served by the first base transceiver station exceeds a first predetermined threshold and responsively decreasing the power levels of signals the first base transceiver station sends to mobile stations communicating with the first base transceiver station and increasing the power levels of signals the second base transceiver station sends to mobile stations communicating with the second base transceiver station; and
    determining that the number of mobile stations being served by the first base transceiver station is less than a second predetermined threshold, wherein the second predetermined threshold is less than the first predetermined threshold, and responsively increasing the power levels of signals the first base transceiver station sends to mobile stations communicating with the first base transceiver station.

2. A computer readable medium having stored therein instructions for causing a central processing unit to execute the method of claim 1.

3. The method of claim 1, wherein increasing the power levels of signals the second base transceiver station sends comprises increasing power levels of signals sent via a forward traffic channel to mobile stations being served by the second base transceiver station.

4. The method of claim 1, wherein increasing the power levels of signals the second base transceiver station sends comprises increasing power levels of pilot signals transmitted by the second base transceiver station.

5. A method for adjusting a range of signals sent by base transceiver stations in a wireless telecommunications network, the method comprising:

determining that a number of mobile stations being served by a first base transceiver station exceeds a first predetermined threshold;

responsively reducing a range of signals the first base transceiver station sends to mobile stations communicating with the first base transceiver station and increasing a range of signals a second base transceiver station sends to mobile stations communicating with the second base transceiver station;

determining that the number of mobile stations being served by the first base transceiver station is less than a second predetermined thresholds wherein the second predetermined threshold is less than the first predetermined threshold; and responsively increasing the range of signals the first base transceiver station sends to mobile stations communicating with the first base transceiver station.

6. A computer readable medium having stored therein instructions for causing a central processing unit to execute the method of claim 5.

7. The method of claim 5, wherein reducing a range of signals the first base transceiver station sends comprises reducing a range of signals sent via a forward traffic channel to mobile stations being served by the first base transceiver station.

8. The method of claim 5, wherein reducing a range of signals the first base transceiver station sends comprises reducing a range of pilot signals transmitted by the first base transceiver station.

9. The method of claim 5, wherein increasing a range of signals the second base transceiver station sends comprises increasing a range of signals sent via a forward traffic channel to mobile stations being served by the second base transceiver station.

10. The method of claim 5, wherein increasing a range of signals the second base transceiver station sends comprises increasing a range of pilot signals transmitted by the second base transceiver station.

11. The method of claim 5, further comprising:

in response to determining that the number of mobile stations being served by the first base transceiver station is less than the second predetermined, decreasing the range of signals the second base transceiver station sends to mobile station communicating with the second base transceiver station.

12. The method of claim 1, wherein decreasing the power levels of signals the first base transceiver station sends comprises decreasing power levels of signals sent via a forward traffic channel to mobile stations being served by the first base transceiver station.

13. The method of claim 1, wherein decreasing the power levels of signals the first base transceiver station sends comprises decreasing power levels of pilot signals transmitted by the first base transceiver station.

14. The method of claim 1, further comprising:

in response to determining that the number of mobile stations being served by the first base transceiver station is less than the second predetermined threshold, decreasing the power levels of signals the second base transceiver stations sends to mobile stations communicating with the second base transceiver station.

\* \* \* \* \*